(12) United States Patent
Baudisch et al.

(10) Patent No.: US 7,557,774 B2
(45) Date of Patent: Jul. 7, 2009

(54) DISPLAYING VISUALLY CORRECT POINTER MOVEMENTS ON A MULTI-MONITOR DISPLAY SYSTEM

(75) Inventors: Patrick M. Baudisch, Seattle, WA (US); Edward B. Cutrell, Seattle, WA (US); Kenneth P. Hinckley, Redmond, WA (US); Robert W. Gruen, Charlotte, NC (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 10/918,775

(22) Filed: Aug. 13, 2004

(65) Prior Publication Data
US 2006/0033712 A1 Feb. 16, 2006

(51) Int. Cl.
G09G 5/00 (2006.01)
G09G 5/08 (2006.01)
(52) U.S. Cl. .................................. 345/1.1; 345/157
(58) Field of Classification Search ........... 345/1.1–3.4, 345/156, 157
See application file for complete search history.

(56) References Cited

U.S. PATENT DOCUMENTS

| 5,923,307 | A | * | 7/1999 | Hogle, IV | 345/4 |
| 7,312,764 | B2 | * | 12/2007 | Driver et al. | 345/1.1 |
| 2004/0263424 | A1 | * | 12/2004 | Okuley | 345/1.1 |
| 2005/0068252 | A1 | * | 3/2005 | Driver et al. | 345/1.1 |

OTHER PUBLICATIONS

Patrick Baudisch and Ruth Rosenholz, Halo: a Technique for Visualizing Off-Screen Location, Apr. 5-10, 2003, CHI 2003, pp. 481-488.*
MacKenzie, I.S., "Fitts' Law as a Research and Design Tool in Human-Computer Interaction," *Human-Computer Interaction* 1992, 7:91-139.
Mackinlay, J.D., et al., "Wideband Visual Interfaces: Sensemaking on Multiple Monitors," *Technical Report* UIR-1-2003-05, Palo Alto Research Center, Calif., 2003.
Baudisch, P., et al., "Drag-and-Drop and Drag-and-Pick: Techniques for Accessing Remote Screen Content on Touch- and Pen-Operated Systems," *Proc. Interact '03*, pp. 57-64.
Baudisch, P., et al., "Mouse Ether: Accelerating the Acquisition of Targets Across Multi-Monitor Displays," *Proc CHI '04*, Vienna, Austria, Apr. 24-27, 2004, pp. 1379-1382.
Baudisch, P., et al., "High-Density Cursor: a Visualization Technique That Helps Users Keep Track of Fast-Moving Mouse Cursors," *Proc. Interact '03*, pp. 236-243.

(Continued)

*Primary Examiner*—Jimmy H Nguyen
(74) *Attorney, Agent, or Firm*—Lee & Hayes, PLLC

(57) ABSTRACT

A virtual space for displaying the pointer in a visually correct manner on a multi-monitor computer system is presented. The virtual space is kept separate from the internal display surface of the multi-monitor computer system upon which information is written to be displayed on the monitors. The virtual space is established such that the virtual display areas of the virtual space reflect the visual arrangement of the monitors. The virtual space captures all pointer movements, such as by a mouse or other input device, and moves the pointer within the virtual space. On a pointer update frame, the pointer is mapped from the virtual space to the internal display space such that the pointer may be displayed on the monitors.

20 Claims, 11 Drawing Sheets

OTHER PUBLICATIONS

Czerwinski, M., et al., "Women Take a Wider View," *Proc. CHI '02*, Minneapolis, Minnesota, Apr. 20-25, 2002, pp. 195-202.

Dulberg., M.S., et al., "An Imprecise Mouse Gesture for the Fast Activation of Controls," *Proc. Interact. '99*, pp. 375-382.

Grudin, J., "Partitioning Digital Worlds: Focal and Peripheral Awareness in Multiple Monitor Use," *Proc. CHI '01*, Seattle, Washington, Mar. 31-Apr. 4, 2001, pp. 458-465.

Gutwin, C., "Improving Focus Targeting in Interactive Fisheye Views," *Proc. CHI '02*, Minneapolis, Minnesota, Apr. 20-25, 2002, pp. 267-274.

MacKenzie, I.S., "Fitts' Law as a Research and Design Tool in Human-Computer Interaction," *Human-Computer Interaction* 1992, 7:91-139.

McGuffin, M., and R. Balakrishnan, "Acquisition of Expanding Targets," *Proc. CHI '02*, Minneapolis, Minnesota, Apr. 20-25, 2002, pp. 57-64.

Sibert, L.E., and R.J.K. Jacob, "Evaluation of Eye Gaze Interaction," *Proc. CHI '00*, The Hague, The Netherlands, Apr. 1-6, 2000, pp. 281-288.

Tan, D.S. and M. Czerwinski, "Effects of Visual Separation and Physical Discontinuities When Distributing Information Across Multiple Displays," *Proc. Interact'03*, pp. 252-255.

Zhai, S., et al., "Manual and Gaze Input Cascaded (MAGIC) Pointing," *Proc. CHI '99*, Pittsburgh, Pennsylvania, May 15-20, 1999, pp. 246-253.

\* cited by examiner

DISPLAYING VISUALLY CORRECT POINTER MOVEMENTS ON A MULTI-MONITOR DISPLAY SYSTEM

FIELD OF THE INVENTION

The present invention relates to displaying pointer movements on a computer system, and more particularly, displaying visually correct pointer movements on a multi-monitor computer system.

BACKGROUND OF THE INVENTION

Multi-monitor computer systems, i.e., a computer system with more than one display/monitor, are becoming more and more prevalent. Their prevalence is due, at least in large part, to the fact that (1) the typical graphic display subsystem provides support for more than one monitor and (2) the cost for a second monitor is relatively small. Another factor is that a multi-monitor computer system offers a computer user more area upon which information and work may be displayed. With a greater display area, the computer user spends less time cycling through overlapping windows, frequently referred to as "thrashing," to find information that may lie hidden under the overlapping windows.

FIG. 1A is a pictorial diagram illustrating an exemplary multi-monitor computer system 100. As shown in FIG. 1A, a computer 102 is attached to two monitors, monitor 104 and monitor 106. However, as most multi-monitor computer users will readily appreciate, and as shown in FIG. 1A, the monitors in a multi-monitor computer system are frequently dissimilar, both in physical size as well as other aspects described below. This is especially true when the multi-monitor computer system is based on a laptop, a tablet computer, or a personal digital assistant (PDA), all with integrated display units.

In addition to differences in physical size, monitors in a multi-monitor computer system may also be dissimilar with regard to screen resolution, i.e., the number of pixels that are displayed on the displayable area of a monitor. As an example, with regard to the exemplary multi-monitor computer system 100, monitor 104 may have a screen resolution of 1024×768 pixels, whereas monitor 106 may have a screen resolution of 1280×1024 pixels. Those skilled in the art will recognize that these screen resolution values, such as 1024× 768 pixels, refer to the number of pixels displayed in each row of pixels (e.g., 1024 pixels per row) by the number of rows of pixels (e.g., 768 rows of pixels). Thus, as appreciated by those skilled in the art, a monitor with a greater screen resolution can display more raw data than a monitor with a lower screen resolution simply because the monitor with the greater screen resolution has more pixels available to display the data.

Monitors also frequently differ with respect to pixel resolution, i.e., the size of each pixel displayed by the monitor. All other factors being equal, monitors with a lower pixel resolution display the same information in less physical area than monitors with a lower pixel resolution. Thus, the monitor with a greater screen resolution is not necessarily physically larger than the monitor with a lesser screen resolution. For example, with reference to FIG. 1A, while monitor 106 is physically larger than monitor 104, both monitors could have the same screen resolution, with monitor 104 displaying its information in a smaller display area due to a smaller pixel resolution. Furthermore, due to a smaller pixel resolution, monitor 104 could have a greater screen resolution than monitor 106.

While multi-monitor computer systems are generally very desirable, due to the differences between monitors, as well as the physical separation and physical alignment of multiple monitors, numerous problems arise with regard to displaying information across the multiple monitors. In particular, some of these problems arise with regard to the visual continuity of a pointer as the pointer is moved across monitor boundaries from a source location to a target location. While also referred to as a "cursor," i.e., the visual image or icon representing a current location on the multi-monitor display area, for purposes of the present invention will use the term "pointer."

For purposes of the present discussion, moving the pointer from a source location to a target location will be generally referred to as "target acquisition." Additionally, the present discussion will refer to a mouse as the input/control device by which the pointer is moved. However, reference to a mouse is for simplicity in description only, and should not be construed as limiting upon the present invention. Those skilled in the art will appreciate that the pointer may be controlled/moved through the use of any number of input/control devices, including, but not limited to, a mouse, touchpad, joystick, pointer keys, and the like.

In conjunction with a mouse, target acquisition relies heavily upon hand-eye coordination based on the spatial arrangement of displayed items. In other words, target acquisition includes both visual and spatial aspects. In this paradigm, the computer user has a legitimate expectation that mouse movements will directly correspond to pointer movements. When mouse movements correspond to pointer movements, target acquisition is facilitated. Conversely, when pointer movements fail to directly correspond to mouse movements, target acquisition is impeded.

On computer systems that include just a primary monitor, the mouse movements almost always directly correspond to pointer movements. Unfortunately, on multi-monitor computer systems, the visual/spatial correlation between mouse movements and pointer movements is almost always disrupted when the pointer crosses monitor boundaries. For example, with regard to FIG. 1A, assume that a user wishes to move the pointer 112 from the source 108 on monitor 104 to the target 110 on monitor 106. As illustrated in FIG. 1A, visually, the source 108 and the target 110 are horizontally aligned, as indicated by line 114. Thus, a user would acquire the target 110 on monitor 106 by moving a mouse (not shown) to the right on a horizontal line with the expectation that the pointer 112 will move in a corresponding toward the target 110.

However, on current multi-monitor computer systems, due to any number of conditions, including, but not limited to, the physical separation of monitors 104 and 106, the physical alignment of the monitors, the internal arrangement of the display surface, the screen resolution of the monitors, and the display resolution of the monitors, the user's expectations are not met.

FIG. 1B, a pictorial diagram illustrating the multi-monitor computer system 100 of FIG. 1A, illustrates the displayed path 116 of the pointer 112 as the user moves the mouse in a horizontal line to its right. Line 114 in FIG. 1B illustrates how the pointer actually "tracks," i.e., is displayed, with the movements to the mouse. As can be seen in FIG. 1B, as the pointer 112 tracks across monitor boundaries from source 108 towards target 110, the cursor jumps, or "warps," across from monitor boundary 116 to monitor boundary 118, the latter being a location not on the horizontal line between the source 108 and target 110. Additionally, while the horizontal mouse movement was small, visually, the pointer's 112 horizontal movement was substantial, i.e., spanning the frames and physical separation of monitors 104 and 106. Clearly, this visual discontinuity is extremely disruptive to target acquisition. Psychophysical studies have demonstrated that the bulk of a pointing movement takes place in a rapid, ballistic mode that is preplanned, without reliance on visual feedback in the early phase of target acquisition. Hence a discontinuity in the pointer trajectory as it crosses a boundary between monitors is disruptive to human performance, and is very difficult for a user to compensate for.

It should be noted, however, that while visually, the pointer 112 warped to an unexpected location, to the system, the pointer 112 tracked along the horizontal line of the mouse without any jumps or warps. As those skilled in the art will appreciate, while multi-monitor computer systems are generally aware that multiple monitors are connected to the system, they are almost universally unaware of physical alignment, separation, and screen resolution issues that affect the visual display of information across the multiple monitors. To the current multi-monitor computer system, conceptually, the internal representation of these monitors is a single, contiguous display surface encompassing the display areas of all monitors. For example, FIG. 1C is a block diagram of the internal display surface 150 of the exemplary multi-monitor computer system 100 of FIGS. 1A and 1B. As shown in FIG. 1C, the display surface includes display areas 120 and 122 corresponding to monitors 104 and 106 respectively.

With regard to the internal display surface 150, a user may be able to specify the arrangement of the multiple display areas to each other, or alternatively, specify the arrangement of one display area to a primary display area. However, the display areas are viewed as contiguous by the computer system 100. However, they do not necessarily reflect the physical arrangement of the corresponding monitors, as a user is free to rearrange the monitors without informing the system 100. Being contiguous, the display areas clearly cannot account for the physical separation between them, nor do they necessarily account for the actual physical alignment of the monitors. As shown in FIG. 1C, in the display surface 150, display areas 120 and 122 are aligned along their bottom. However, as can be seen in FIG. 1B, the bottoms of the displayable areas of monitors 104 and 106 are not aligned.

In addition to physical conditions that exist between monitors, while some current multi-monitor computer systems are aware of the screen resolutions of its monitors, current multi-monitor computer systems are unaware of the pixel resolutions of those monitors. To the multi-monitor computer system 100, each pixel is the same size, irrespective of the corresponding display area/monitor. Unfortunately, as discussed above, monitors frequently differ in pixel resolution and pixel resolution can have a substantial impact on the visual appearance of displayed information, including a pointer 112. Thus, returning to the example of FIGS. 1A and 1B, as the mouse is moved in a horizontal line, visually towards the target 110, the pointer 112 tracks along a logical horizontal line 124 on the display surface 150. Additionally, while source 108 and target 110 visually appear to be horizontally aligned in FIGS. 1A and 1B, as shown in FIG. 1C, to the computer system 100, they are not horizontally aligned.

While FIGS. 1A-1C illustrate some of the display issues, or anomalies, that arise when displaying information across monitors on a multi-monitor computer system, there are others that create just as much confusion and frustration for a user. FIGS. 2A and 2B are pictorial diagrams of the exemplary system 100 for illustrating some of these additional anomalies. In the example illustrated in FIG. 2A, the source 108 is now found on monitor 106 and the target 110 on monitor 104. Visually, both source 108 and target 110 are horizontally aligned. Thus, to the computer user, it would appear that, in order to acquire the target 110, the user must move the pointer 112 on a direct horizontal line to the left, as indicated by line 204

Unfortunately, as illustrated in FIG. 2B, as the user encounters the edge of the display area of monitor 106, the pointer 112 is stopped from crossing over to monitor 104 by an unseen barrier 202. This unseen barrier exists due to various differences and conditions between monitors 104 and 106 as described above. To better explain, FIG. 2C is a block diagram illustrating the exemplary internal display surface 150 of the multi-monitor computer system 100. Source 108 and target 110 are shown at the locations where the computer understands them to be. Similar to their internal arrangement discussed above in regard to FIGS. 1A-1C, in the display surface 150 of FIG. 2C, source 108 and target 110 are not horizontally aligned.

As discussed above, display areas 120 and 122 are aligned along their bottom edge. Because display area 122 is larger than display area 120 (meaning that for this example, the screen resolution for monitor 106 is greater than the screen resolution for monitor 104), a top segment of display area 122 is not contiguous with any portion of display area 120. Furthermore, as can be seen in FIG. 2C, the computer system 100 believes that source 108 resides in this top portion. Accordingly, as the pointer 112 is tracked to its left on a horizontal line, the edge of the display surface 150 is encountered and further travel in that direction is prohibited, hence the invisible, apparent barrier 202.

FIG. 3A is a pictorial diagram illustrating an exemplary multi-monitor computer system 300 for further illustrating the pointer display issues described above. As shown in FIG. 3A, this exemplary multi-monitor computer system 300 includes three monitors/display devices, including the tablet computer's 302 integrated display, as well as monitors 304 and 306. For purposes of the present discussion, with regard to the multi-monitor computer system 300, it will be assumed that monitors 304 and 306 are the same type of monitor having the same screen resolution, 1280×1024 pixels. Furthermore, the tablet computer's 302 integrated display, according to its current orientation, has a screen resolution of 768×1024 pixels.

As illustrated in FIG. 3A, the source 108 and pointer 112 are on the tablet computer's 302 integrated display and the target is on monitor 306. As illustrated by line 304, visually, the user wishes to move the pointer 112 from source 108 to target 110 in a direct line. However, as the pointer 112 attempts to cross out of the tablet computer's 302 display area towards the target 110, the pointer is again stopped by an invisible barrier, i.e., is not actually displayed to the user, as indicated by a barrier 308.

FIG. 3B illustrates the exemplary display surface 350 of the exemplary multi-monitor system 300. As illustrated on the exemplary display surface 350, as the pointer 112 tracks from the source 108 on a direct line to the target 110, the user encounters the edge of the display area 318 corresponding to the tablet computer's 302 display. According to the arrangement of the internal display surface 350, there is no display area immediately to the right of display area 318. Thus, the pointer 112 cannot continue in its current direction toward target 110, hence the apparent, invisible barrier 308. For the user, in order to acquire the target 110, the user must move the pointer 112 up into the display area 314 corresponding to monitor 304, and then to the target 110 on display area 316 corresponding to monitor 306.

As clearly illustrated in the above examples, differences in physical size, screen resolution, pixel resolution, physical and internal alignments, and physical separation all affect the visual display continuity of the pointer 112 as the user moves a pointer from a source 108 to a target 110 across multiple monitors. Thus, in order to provide visual continuity as displaying the pointer, a computer system must first be able to determine those differences. A novel invention to determine these differences and dissimilarities between monitors in a multi-monitor computer system has been set forth in co-pending, and commonly assigned, U.S. patent application Ser. No. 10/884,537, filed Jul. 2, 2004, entitled "System and Method for Determining Display Differences Between Monitors on Multi-Monitor Computer Systems," which is incorporated herein by reference (hereafter referred to as the "incorporated reference"). As described in the incorporated reference, a computer system displays user-actionable information across multiple monitors such that based on minimal user interactions, the computer system can determine the relative differences in screen resolutions, pixel resolutions, physical alignment, physical separation, and rotation of two monitors in a multi-monitor computer system. This determined information can then be advantageously used by a software application to display information on the multi-monitor computer system. The interaction between the computer system and the user to determine the relative differences in screen resolutions, pixel resolutions, physical alignment, physical separation, and rotation of monitors in a multi-monitor computer system will be referred to hereafter as the "calibration process," and the determined information will be referred to as the "calibration information."

Those skilled in the art will recognize that alternative calibration processes may be employed. For example, for displays that include a touchscreen or pen input surface, sweeping one's finger or a pen across the two displays can be used to compute the physical alignment and rotation of the two displays. As an alternative, a calibration process could be completed by drawing a line with a mouse on one display, and then drawing a matching line with a mouse on another display. In some cases, calibration might even be completely automated by using range sensors, such as those used in cameras to sense the distance to a subject. Monitors equipped with such sensors mounted to the bezel could sense the distance to and alignment of displays incorporating proximity sensors. The system of the present invention could use such automatically generated sensor information in lieu of, or in conjunction with, one or more explicit user interactions to indicate physical alignment, physical separation, and rotation between monitors.

While the calibration information may be determined and advantageously used by software applications, unfortunately, in current multi-monitor computer systems, the pointer 112 can not. As indicated above, the pointer (as well as its display) is intimately tied to the computer system's internal display surface, such as display surfaces 120 or 350. Thus, even when software applications compensate for display differences between monitors, the visual display of the pointer 112 is tied to the computer system's display surface, and is therefore unable to take advantage of the determined calibration information.

In light of the above-described issues, what is needed is a system and method that displays the pointer, in a visually correct and/or consistent fashion, in a multi-monitor computer system. The present invention addresses these and other issues found in the prior art.

SUMMARY OF THE INVENTION

In accordance with aspects of the present invention, a multi-monitor computer system for displaying the pointer in a visually correct manner as the pointer move across monitor boundaries is presented. The system comprises a computing device connected to a plurality of monitors. The computing device includes a display surface comprising display areas. Each display area, corresponding to one of the plurality of monitors, is for displaying information on the corresponding monitor. The computing device further comprises a virtual pointer space. The virtual space includes virtual display areas, each virtual display area corresponding to one of the plurality of monitors. The virtual display areas are arranged within the virtual space such that their arrangement reflects the visual appearance of the plurality of the monitors to the user. The virtual space maintains the pointer position in virtual pointer space coordinates. The virtual pointer space captures all pointer movement events and updates the pointer position within the virtual pointer space according to the captured pointer movement events.

In accordance with further aspects of the present invention, a method for displaying a pointer in a visually correct manner as it crosses monitor boundaries on a multi-monitor computer system comprising a computing device and a plurality of monitors, is presented. A virtual pointer space is established for the multi-monitor computer system. The virtual pointer space comprises a plurality of virtual display areas corresponding to the plurality of monitors in the multi-monitor computer system. The virtual display areas are arranged within the virtual pointer space such that their arrangement reflects the visual appearance of the corresponding monitors to a user. The pointer for the multi-monitor computer system is mapped from its current position on the computer system's internal display surface to a corresponding location in the virtual pointer space. Pointer movement events are captured and the pointer position is updated in the virtual pointer space according to the captured pointer movement events. For each pointer update frame, the pointer is mapped from its position in the virtual space to a corresponding location on the multi-monitor computer system's internal display surface for display to a user.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 3A:
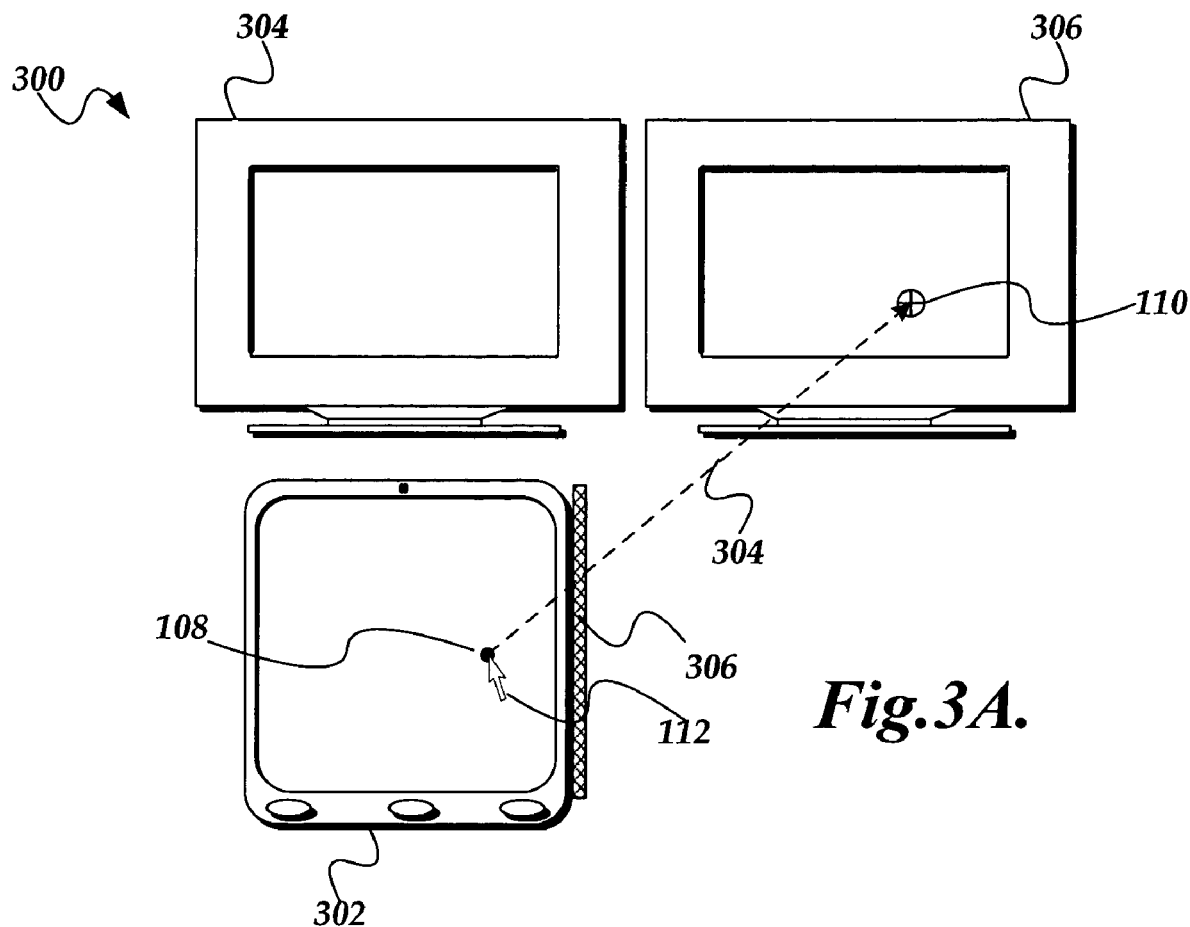
FIG. 3A is a pictorial diagram of yet another exemplary multi-monitor computer system for further illustrating the visual discontinuity and anomalies that arise when tracking the pointer across multiple monitors in a multi-monitor computer system.
Figure 4:
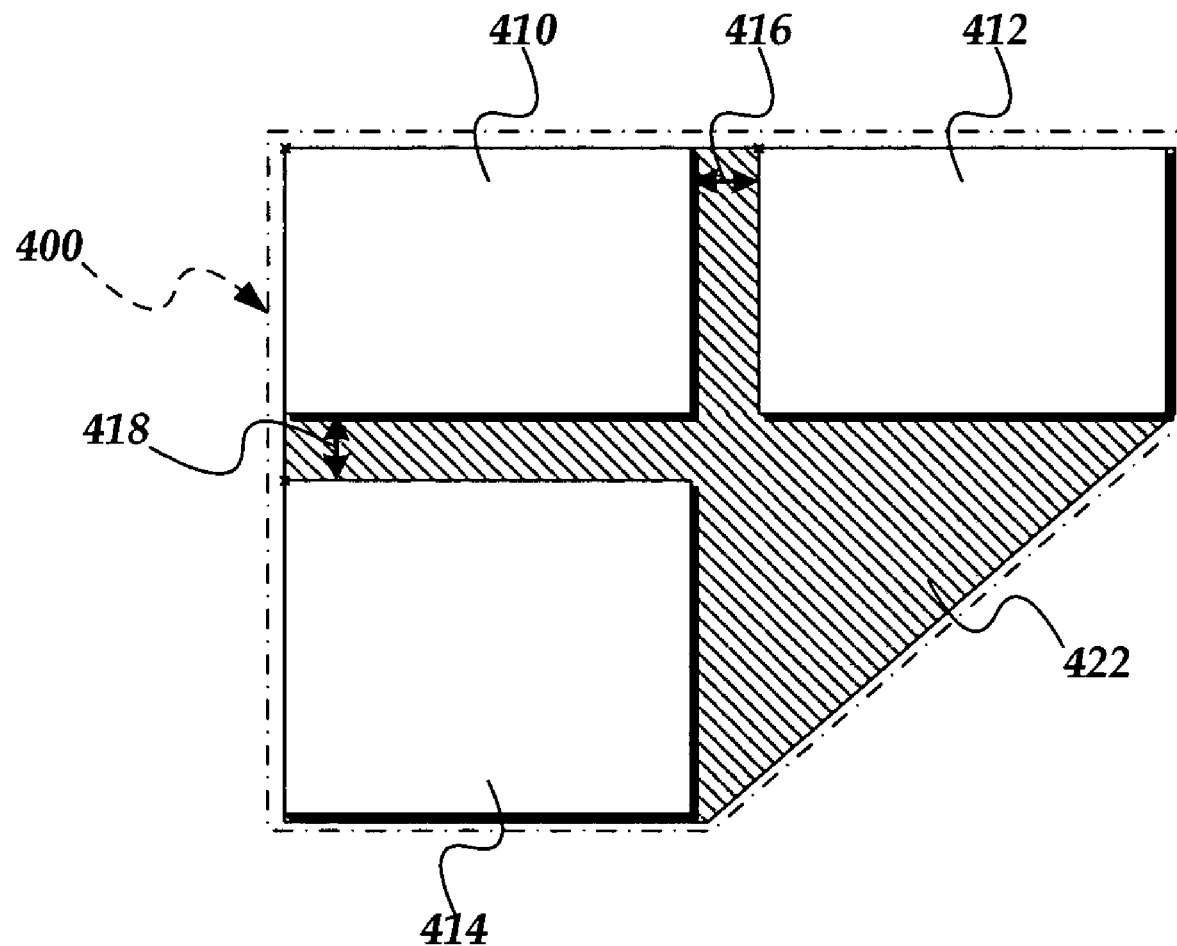
FIG. 4 is a block diagram illustrating an exemplary virtual pointer space for the multi-monitor computer system of FIG. 3A, formed in accordance with the present invention.

In order to enable a multi-monitor computer system to display visually correct pointer movements as the pointer crosses monitor boundaries, a virtual space is created. FIG. 4 is a block diagram illustrating exemplary virtual space 400 for the multi-monitor computer system 300 of FIG. 3A. As its name suggests, the virtual space is a conceptual space that corresponds to the physical arrangement and alignment of monitors in the multi-monitor computer system, as well as differences in screen resolutions, pixel resolutions, and the like as determined in the calibration processes, i.e., determining the relative differences among the monitors, described in the incorporated reference.

While there are some similarities between the internal display surface 350 and virtual space, there are also many differences. For example, a computer system's internal display surface, such as display surface 350 for computer system 300, includes display areas for each monitor. The virtual space 400 that corresponds to computer system 300 also includes virtual display areas for each monitor, in particular, virtual display areas 410, 412, and 414 corresponding to monitor 302, 304, and 306. However, in contrast to a typical internal display surface, virtual display areas in a virtual space are not necessarily contiguous. Though in the corresponding internal display surface 350 the display areas 314, 316, and 318 are contiguous, as illustrated in FIG. 4, virtual display areas 410, 412, and 414 are all separated by empty virtual space 422, as indicated by lines 416 and 418. The actual amount of empty virtual space between virtual display areas in a virtual space corresponds to the visual/physical separation of monitors, as determined by the calibration processes of the incorporated reference.

As virtual display areas in a virtual space are not contiguous, the virtual space keeps track of each virtual display area according to an origin in the virtual space, and a size. As can be seen in regard to FIGS. 3B and 4, the size of the virtual display areas 410, 412, and 414 in the virtual space 400 do not always mimic the size of the corresponding display areas 314, 316, and 318 in the internal display surface 350. Instead, the size of the virtual display areas 410, 412, and 414 in the virtual space 400 correspond to their visual/apparent size as displayed to the user as displayed on the corresponding monitor. As previously mentioned, the screen resolutions of monitors 304 and 306 are 1280×1024 pixels, and the displayable area of the tablet computer 302 has a screen resolution of 768×1024. However, as can be seen from comparing FIGS. 3A and 4, the apparent width of the tablet computer's 302 display is equal to the width of the display area of monitors 304 and 306. Accordingly, the virtual display area 414 in the virtual space 400 is larger than the corresponding display area 318 in the internal display surface 350. In other words, the size of each virtual display area in a virtual space corresponds to the visual/apparent size of the display area to a user. Additionally, the origin of each virtual display area in a virtual space is set such that the virtual display area is located visually within the virtual space 400.

Clearly, as the tablet computer 302 has a screen resolution of 768×1024 pixels and monitors 304 and 306 have a screen resolution of 1280×1024 pixels, displaying a pointer in a visually correct fashion means any portion of the pointer displayed on a display area should be scaled according to the actual monitor's screen dimensions and pixel resolution. For example, if the pointer were displayed on monitor 304 in a 20×30 rectangle, due to pixel resolution and screen resolution differences, the same 20×30 rectangle would normally appear substantially larger on the tablet computer 302, due to its lower screen resolution and higher pixel dimension/resolution. To compensate, according to one embodiment, the pointer is scaled according to the screen and pixel resolutions, relative to other monitors in the multi-monitor computer system as determined in the calibration process referenced above. In this manner, the virtual space maintains a scale factor for each display area. The scale for each monitor may be based on the screen resolution of a given display area relative to the screen resolution of the display area with the highest screen resolution. Alternatively, this scale may be based on the pixel resolution of a given display area relative to the pixel resolution of the display area with the lowest pixel resolution (i.e., the smallest pixel size).

According to aspects of the present invention, the area encompassed by the virtual space 400 should be of sufficient size to include all virtual display areas. However, while there may be a minimum size for a virtual space 400, i.e., sufficiently large to encapsulate all virtual display areas, a virtual space could be formed in any number of shapes and/or sizes. In an exemplary embodiment, the virtual space 400 is defined as the convex hull of all virtual display areas in the multi-monitor computer system, as illustrated by virtual space 400 of FIG. 4.

Figure 5:
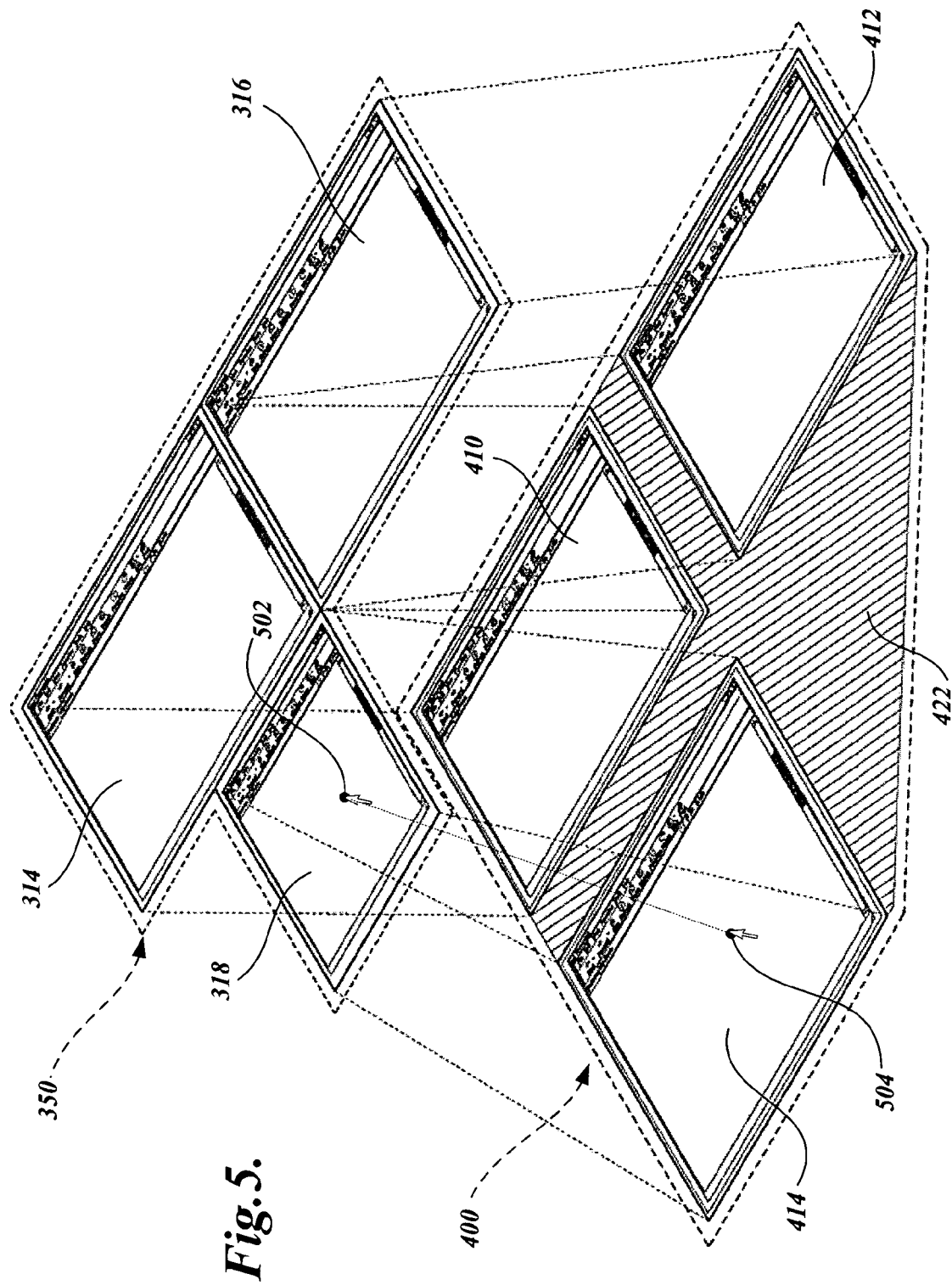
FIG. 5 is a pictorial diagram illustrating the mapping between the internal display surface of FIG. 3B into the virtual pointer space of FIG. 4.

According to aspects of the present invention, the dimensions of the virtual space 400 are determined after the referenced calibration process has determined the calibration information regarding the monitors in the multi-monitor computer system. Using this calibration information, the arrangement and size for virtual display areas are determined, and display areas from the display surface 350 are mapped or plotted into a virtual space 400. Initially, the virtual space 400 is of sufficient size (perhaps without any limits) to include all virtual display areas. Once the virtual display areas are located in the virtual space, the boundaries of the virtual space, such as a convex hull, can be determined. FIG. 5 is a pictorial diagram illustrating a mapping of display areas 314, 316, and 318 in the internal display surface 350 to virtual display areas 410, 412, and 414 in the virtual space 400, which, in contrast to the internal display surface 350, now includes empty virtual space 422.

After initializing/establishing the virtual space 400, the current pointer position on the internal display surface 350 is obtained and mapped into virtual space 400. For example, as shown in FIG. 5, the pointer position 502 on the internal display surface 350 is mapped to a visually corresponding position 504 on the virtual space 400.

As indicated above, one of the problems with current multi-monitor computer systems is that pointer movements are intimately tied to the internal display surface 350 which is unaware of the differences and conditions between monitors that affect the visual display of the pointer across multiple monitors. However, the virtual space 400 is aware of the differences and conditions, and furthermore, is not tied to the internal display surface 350. In fact, to complete the separation of the virtual space 400 from the internal display surface 350, after the virtual space is established and operational, all mouse movements corresponding to moving the pointer are captured by the virtual space 400. The pointer position is kept in terms of the coordinate system of the virtual space 400.

Those skilled in the art will recognize that on a periodic basis, referred to hereafter as "pointer update frames", the pointer is redrawn onto the internal display surface 350 so that the pointer is displayed in its current position. Thus, on pointer update frames, the current position of the pointer in terms of the virtual space 400 is mapped to the internal display surface 350, and the pointer 112 is displayed on the monitors in the multi-monitor computer system from the internal display surface. According to aspects of the present invention, as mentioned above, in order to maintain visual consistency, the pointer may be scaled according to a scale factor of a display area in the internal display surface 350 in order to maintain visual consistency across monitors.

Figure 1A:
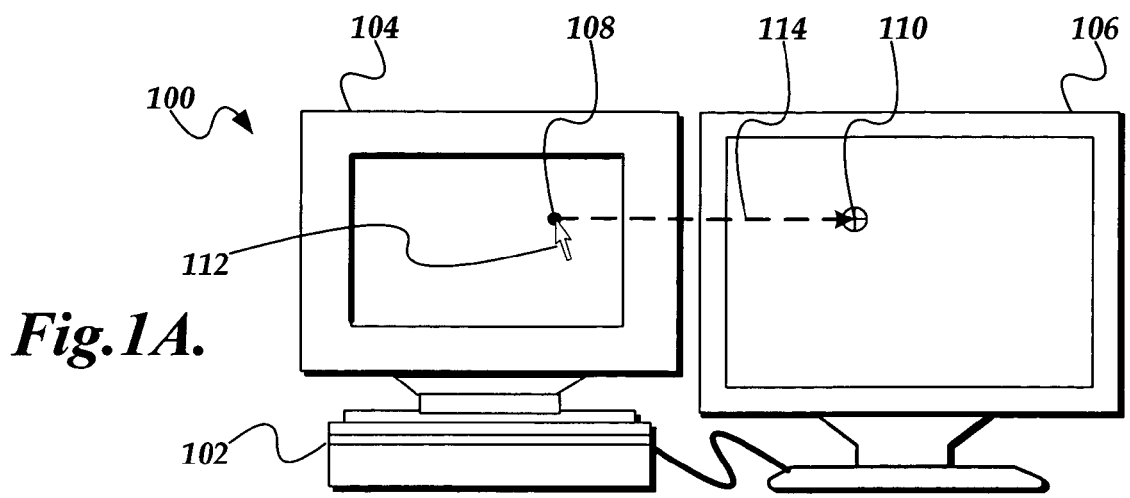
FIGS. 1A and 1B are pictorial diagrams of an exemplary multi-monitor computer system for illustrating the visual discontinuity of displaying a pointer as it tracks from one monitor to another.
Figure 1B:
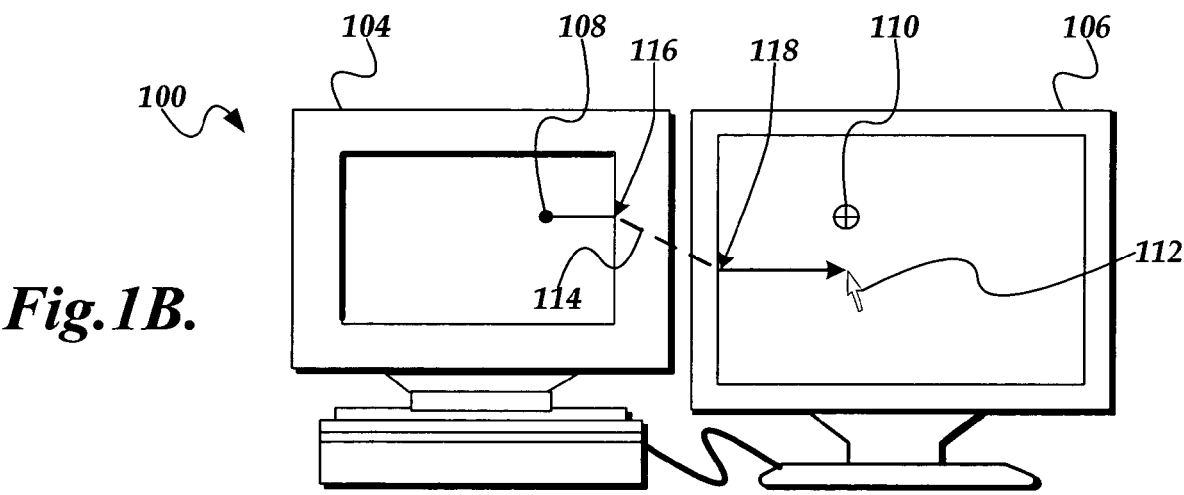
Figure 1C:
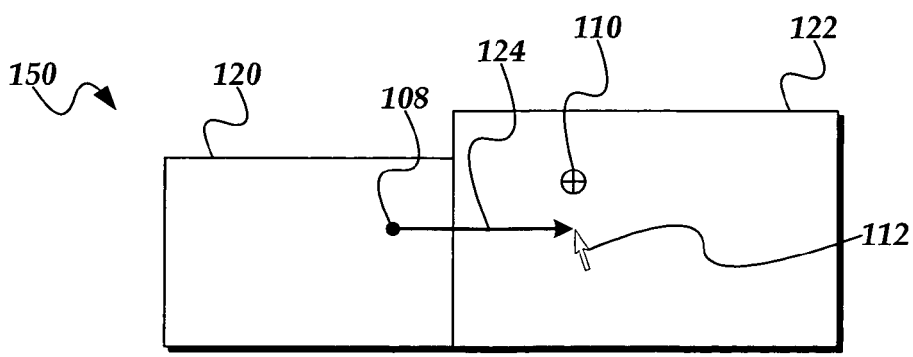
FIG. 1C is a block diagram illustrating an exemplary internal display surface corresponding to the exemplary multi-monitor computer system of FIGS. 1A and 1B for illustrating the internal display areas of the multi-monitor computer system with respect to the pointer movements described in FIGS. 1A and 1B.
Figure 2A:
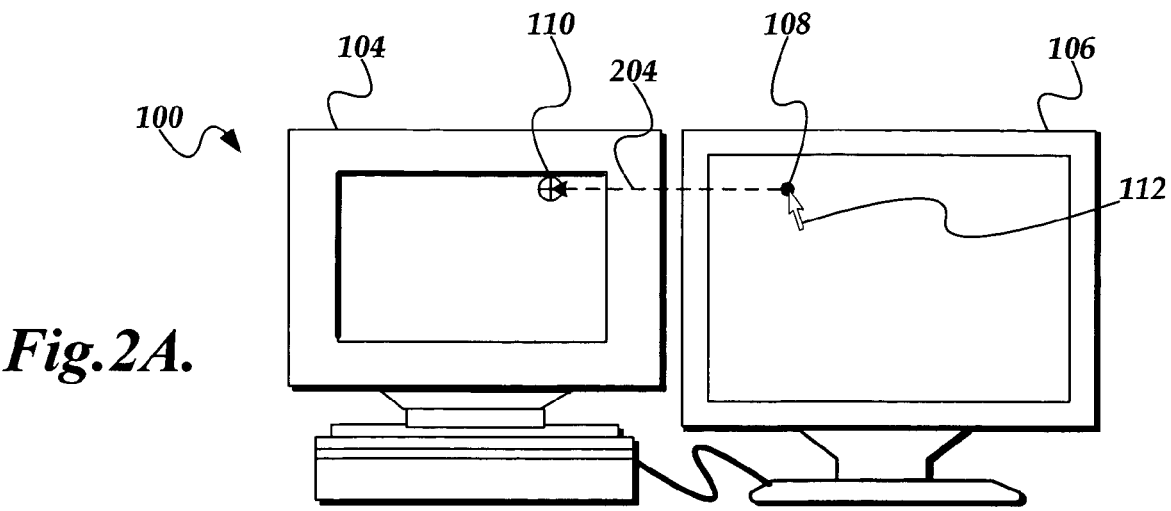
FIGS. 2A and 2B are pictorial diagrams illustrating the exemplary multi-monitor computer system of FIGS. 1A and 1B for further illustrating visual discontinuity in displaying a pointer as it tracks from one monitor to another.
Figure 3B:
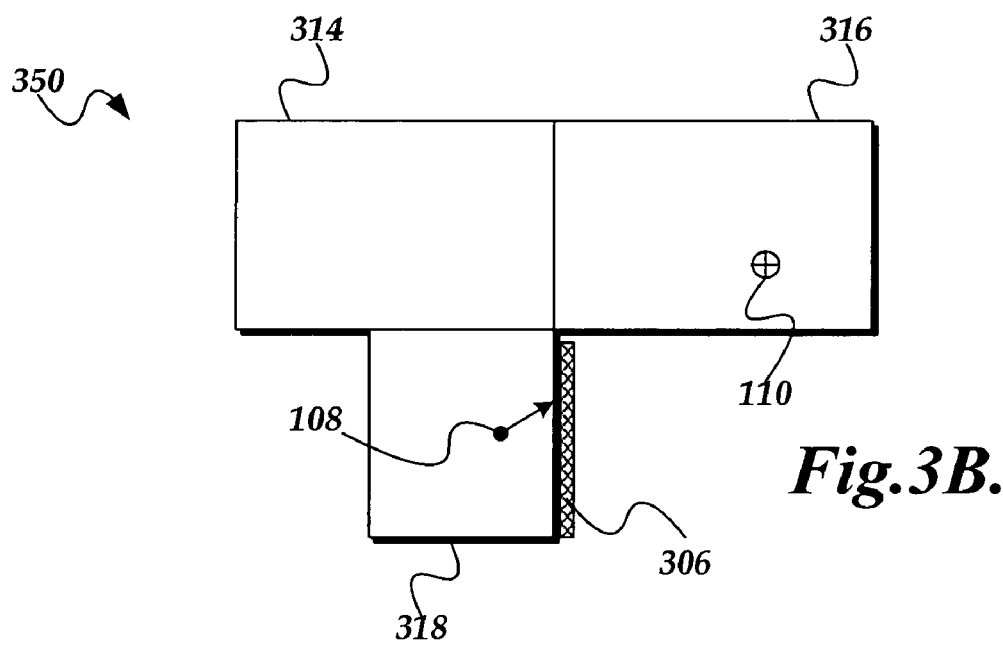
FIG. 3B is a block diagram illustrating an exemplary internal display surface corresponding to the exemplary multi-monitor computer system of FIG. 3A for illustrating visual discontinuity and anomalies that arise when tracking the pointer across multiple monitors in a multi-monitor computer system.
Figure 6A:
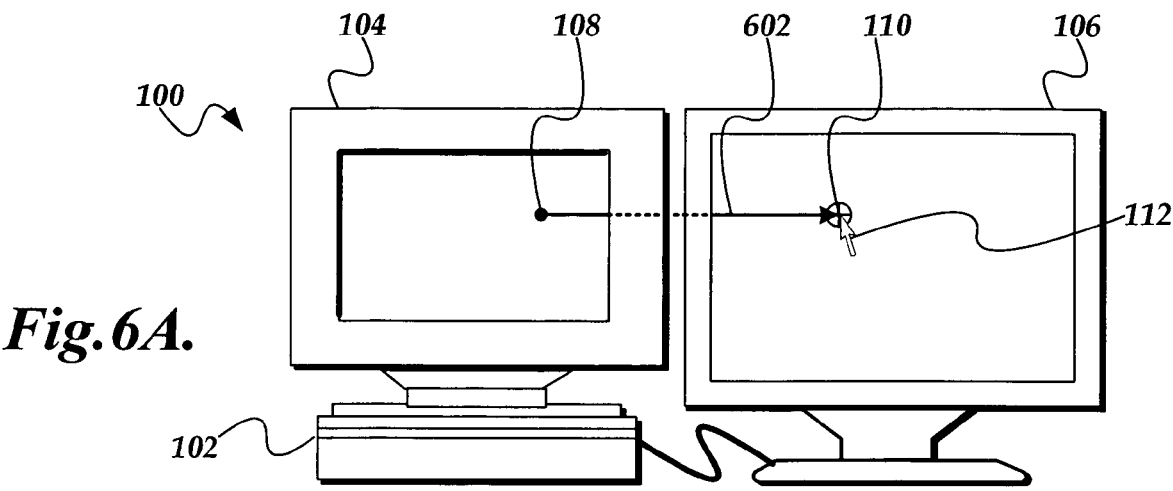
FIG. 6A is a pictorial diagram of the exemplary multi-monitor computer system of FIG. 1A illustrating how the present invention facilitates target acquisition by providing visually correct pointer movements across monitors in the multi-monitor computer system.
Figure 6B:
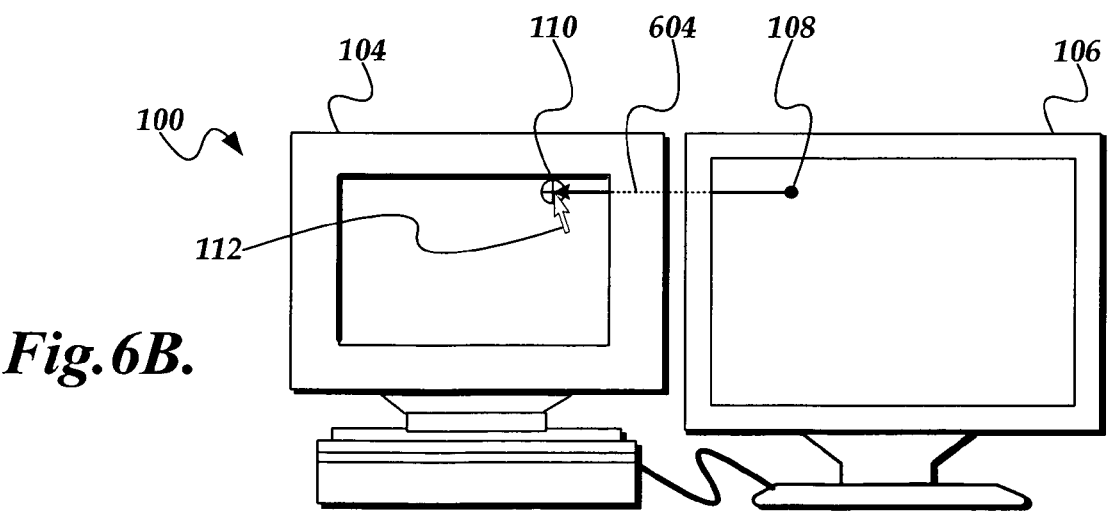
FIG. 6B is a pictorial diagram of the exemplary multi-monitor computer system of FIG. 2A illustrating how the present invention facilitates target acquisition by providing visually correct pointer movements across monitors in the multi-monitor computer system.
Figure 6C:
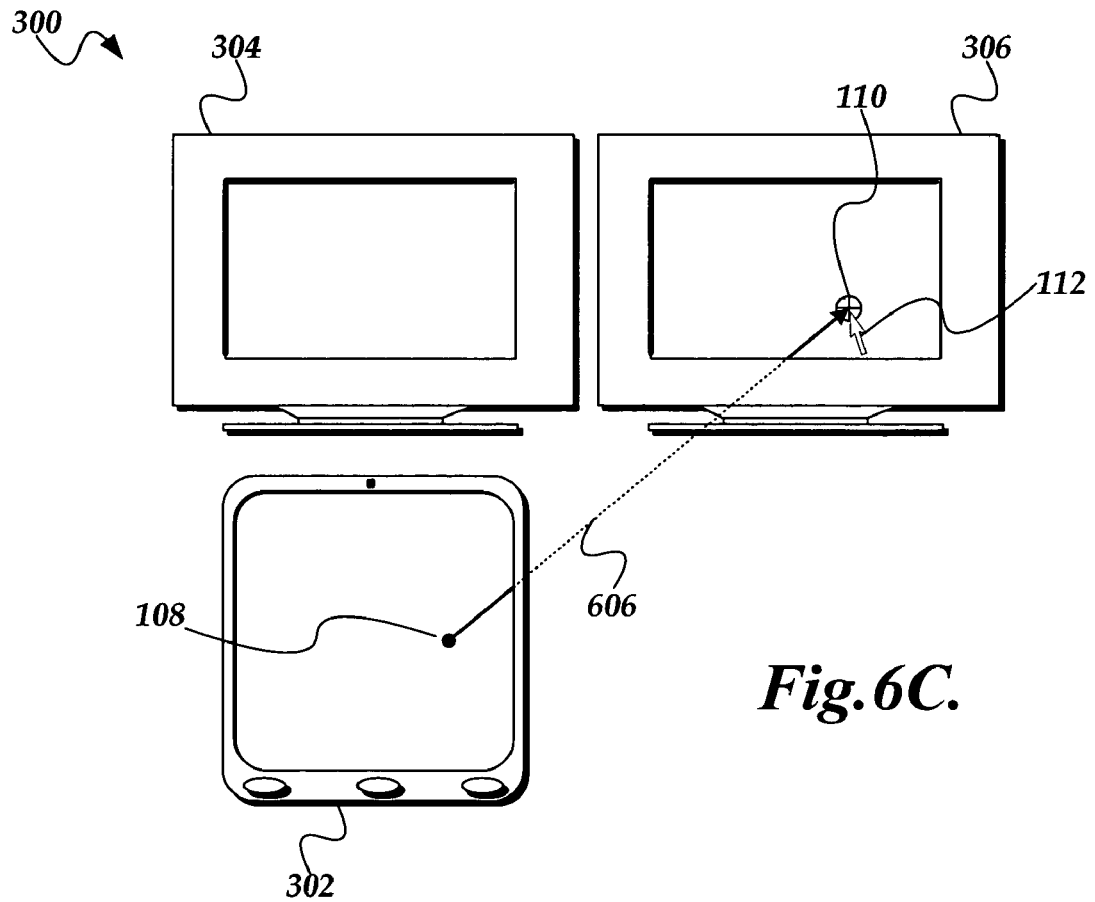
FIG. 6C is a pictorial diagram of the exemplary multi-monitor computer system of FIG. 3A illustrating how the present invention facilitates target acquisition by providing visually correct pointer movements across monitors in a multi-monitor computer system.

Once the virtual space 400 is established, the pointer can be moved across multiple monitors in a visually correct/consistent manner. For example, FIGS. 6A-6C are pictorial diagrams of the exemplary multi-monitor computer systems of FIGS. 1A, 2A, and 3A, illustrating the pointer movement between the source 108 and the target 110 adapted with a virtual space. In particular, FIG. 6A illustrates the exemplary multi-monitor computer system 100 as the user acquires the target 110 on monitor 106 from the source 108 on monitor 104. In contrast to the "warp" that was described in regard to FIG. 1A, the user is able to move the pointer 112 in a visually direct horizontal line 602 from the source 108 to the target 110. The dashed portion of line 602 indicates that the pointer 112 travels through an undisplayable portion of the corresponding virtual space, referred to previously as the empty virtual space.

Figure 2B:
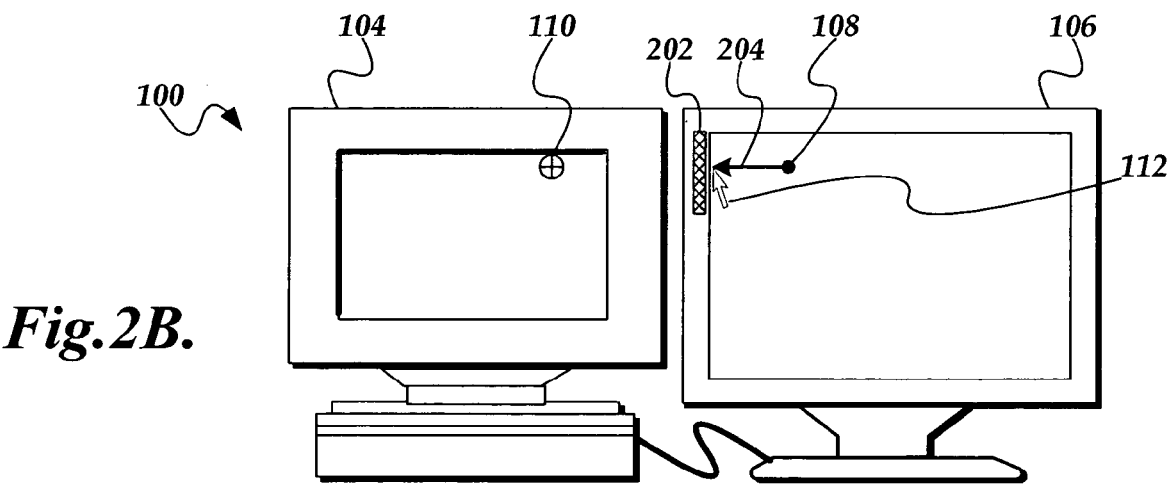
Figure 2C:
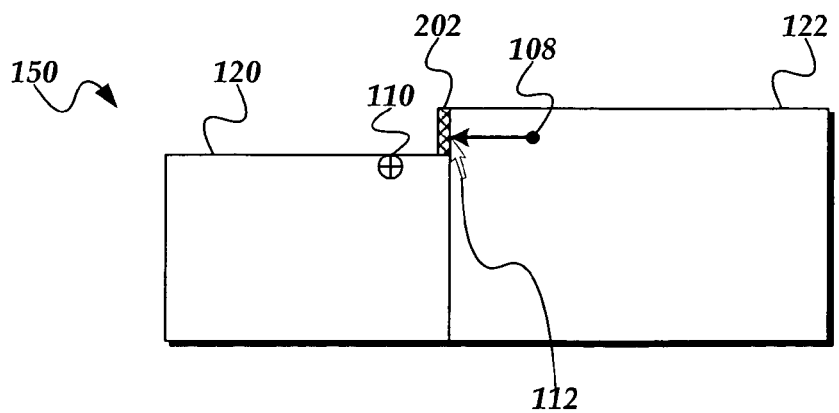
FIG. 2C is a block diagram illustrating the exemplary internal display surface of FIG. 1C for illustrating the internal display areas of the multi-monitor computer system with respect to the pointer movements described in FIGS. 2A and 2B.

Similarly, FIG. 6B illustrates the exemplary multi-monitor computer system 100 as the user acquires the target 110 on monitor 104 from the source 108 on monitor 106, as discussed above in regard to FIGS. 2A and 2B. In contrast to the apparent barrier 202 (FIG. 2B) that is encountered as the user attempts to move the pointer from the source 108 on monitor 106 on a direct line to the target 108 on monitor 104, when the multi-monitor computer system 100 implements a virtual space, the apparent barrier 202 no longer exists and the user can move the pointer directly from the source 108 to the target 110, as indicated by the horizontal line 604. As with line 602 of FIG. 6A, the dashed portion of line 604 indicates that the pointer 112 travels through empty virtual space.

Figure 6D:
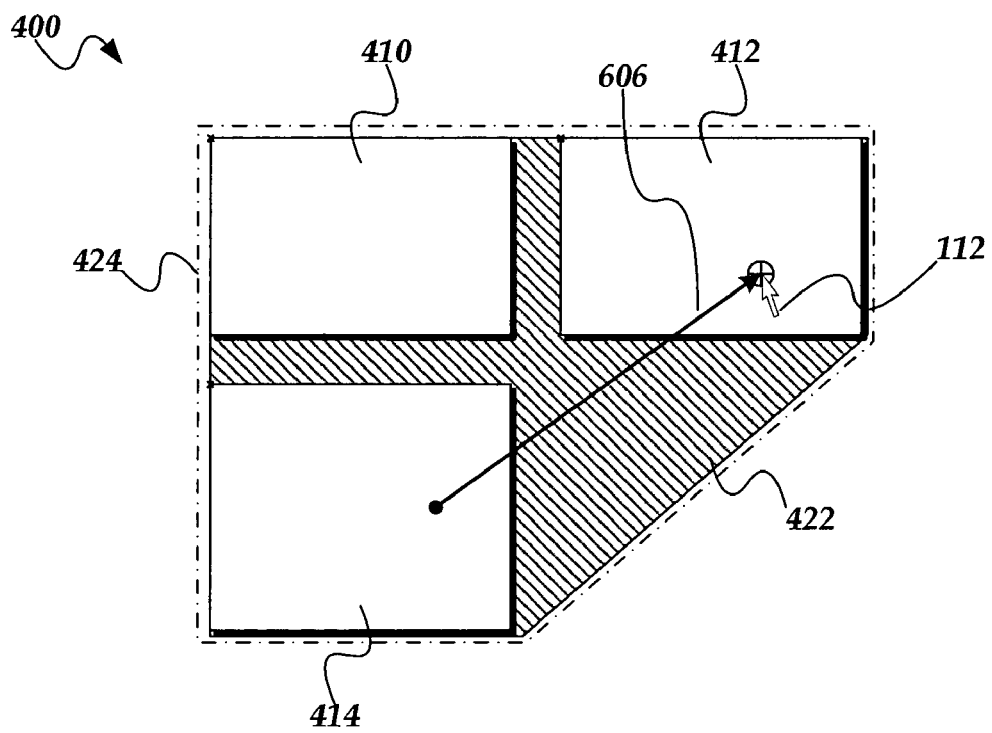
FIG. 6D is a block diagram of an exemplary virtual pointer space of the multi-monitor computer system of FIG. 5C illustrating the pointer moving from the source to the target through the virtual pointer space.

FIG. 6C illustrates the exemplary multi-monitor computer system 300 of FIG. 3A as the user acquires the target 110 on monitor 306 from the source 108 on the tablet computer 302. With the multi-monitor computer system 300 utilizing the corresponding virtual space 400 (FIG. 4), the user is able to move the pointer 112 directly from the source 108 to the target 110, traveling through the empty virtual space 422, as indicated by line 606. FIG. 6D is a block diagram of the exemplary virtual space 400 illustrating the path 606 of the pointer 112 as it travels from the source 108 on display area 414 to the target 110 on display area 412.

Figure 7:
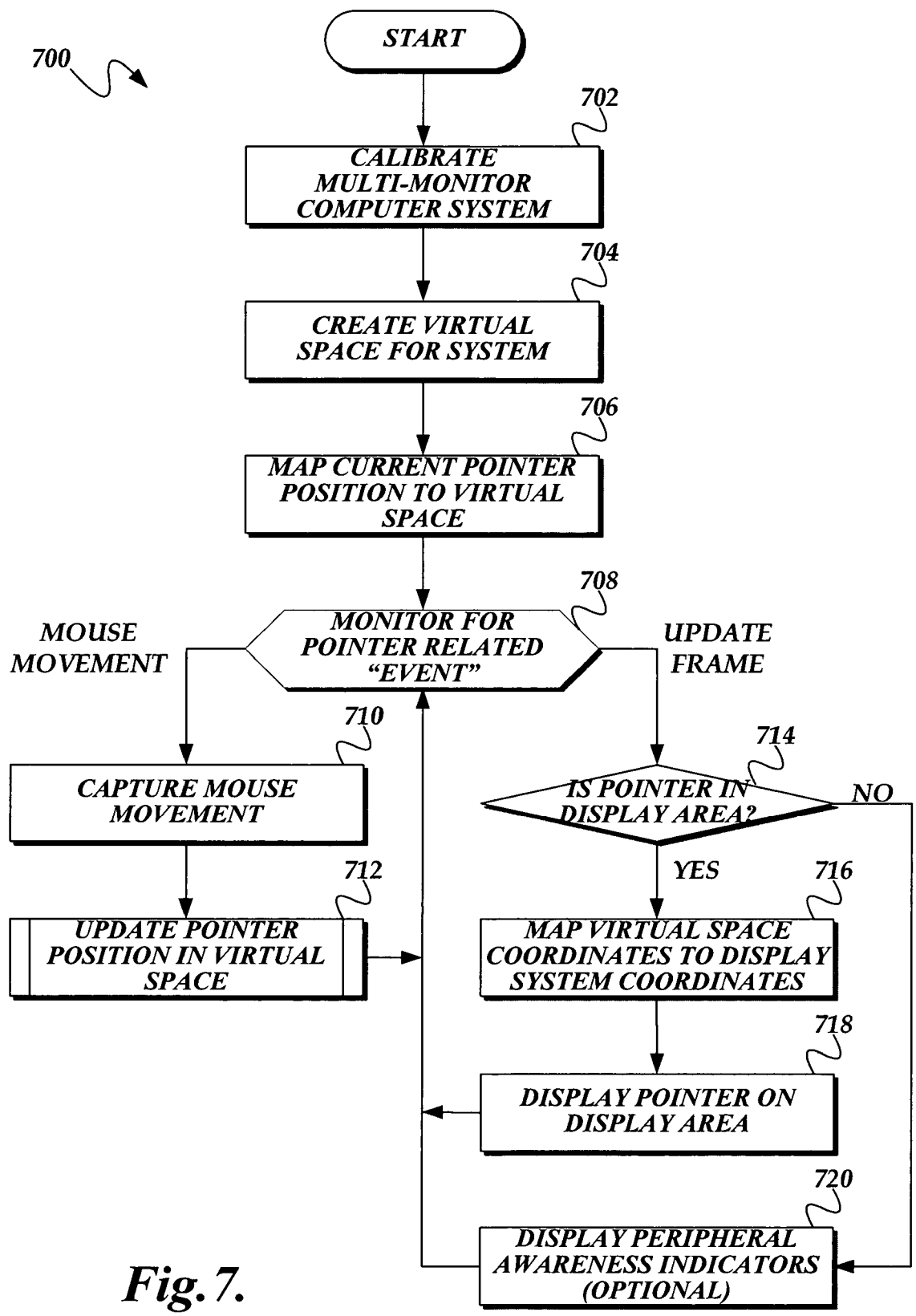
FIG. 7 is a flow diagram of an exemplary routine for implementing a virtual pointer space and displaying pointer movements in the virtual pointer space for a multi-monitor computer system.

FIG. 7 is a flow diagram of an exemplary routine 700 for implementing a virtual space on a multi-monitor computer system, and displaying pointer movements in the virtual space. Beginning at block 702, the multi-monitor computer system is calibrated by determining the display differences and conditions and dissimilarities that exist between monitors in the multi-monitor computer system, as described above in the above-incorporated reference. Based on the calibration information determined during the calibration process, at block 704, a virtual space is created for the multi-monitor computer system. At block 706, the current pointer position, as located on the internal display surface, is mapped into the virtual space.

After having initialized the computer system with a virtual space, at block 708, the system monitors for pointer-related events. If a mouse movement event is encountered, at block 710, the virtual space captures that mouse movement. At block 712, the pointer position in the virtual space is updated according to the mouse movement. In a simple form, the virtual space is unlimited in size and, thus, the pointer could move in any direction. However, the pointer would be easily lost in a size-unlimited virtual space. Thus, as mentioned above, preferably the virtual space is limited in size such that it encompasses the display areas and the empty space between them.

As the virtual space may be bounded, the coordinates of the pointer in the virtual space must be maintained within the virtual space's boundaries. Thus, with each mouse movement, a check may be necessary to ensure that the pointer stays within the boundaries of the virtual space. Updating the pointer position in virtual space according to mouse movements is described in greater detail below in regard to FIGS. 8A and 8B.

After updating the pointer position in virtual space, the routine 700 returns again to block 808 where the routine monitors for additional pointer-related events. In addition to mouse movement events, the routine 700 also monitors for update frame events. Upon detecting an update frame event, at decision block 714, a determination is made as to whether the pointer is located in a virtual display area, or, alternatively, whether the pointer is currently located in empty virtual space. According to one aspect of the present invention, this determination is made by cycling through each virtual display area in the virtual space and, based on each virtual display area's origin and dimension, evaluate whether the displayed pointer (i.e., both its origin as well as its displayed image) falls on a virtual display area. While it is less common on a multi-monitor computer system utilizing a virtual space, due to the fact that there may be empty space between display areas, the pointer may fall on, or intersect with, more than one virtual display area.

If the pointer is currently positioned over one or more virtual display areas, the routine 700 proceeds to block 716. At block 716, the current pointer position is mapped from its current virtual space coordinates/position to coordinates corresponding to the internal display surface. Mapping the pointer from the virtual space to the internal display surface is more than just mapping the origin of the pointer to the internal display surface and rendering the pointer. As indicated above, the pointer (or the pointer's displayed image) may fall, in whole or in part, in empty virtual space as well as multiple virtual display areas. Furthermore, one virtual display area may require information be displayed with a different scale than another. Thus, to properly map the pointer from the virtual space to the internal display surface for display on the multi-monitor computer system during the update frame, portions of the displayable pointer image that fall on a particular virtual display area in the virtual space must be mapped onto a corresponding display area on the internal display surface. At block 718, after having mapped the pointer from the virtual space to the internal display surface, the pointer is displayed on the monitors of the multi-monitor computer system. Thereafter, the routine 700 returns to block 708 to monitor for further pointer-related events.

While not possible in current multi-monitor computer system, in a multi-monitor computer system using a virtual space, the pointer may be in empty virtual space, such as behind the borders of the monitors or in the physical separation of the monitors. When this occurs, it is often beneficial to the user to provide visual indicators as to where the pointer is located. For example, in one embodiment, a semi-transparent circle, called a halo, is projected around the pointer such that at least one segment of the halo falls on a display area displayed by a monitor. By mentally evaluating the segment of the halo displayed on at least one monitor, the user is able to determine the general location of the pointer in the empty virtual space. Other visual feedback devices may also be used. Visual feedback devices for indicating the position of the pointer (or any other object) that do not currently fall on, or intersect with, a virtual display area of the virtual space are referred to as peripheral awareness indicators. One example of a peripheral awareness indicator is described in greater detail in Patrick Baudisch, et al., *Halo: A Technique for Visualizing Off-Screen Locations*, Proceedings of CHI 2003, April 2003, pp. 481-488, which is incorporated by reference.

At decision block 714, if the pointer does not currently intersect with a virtual display area in the virtual space, the routine 700 optionally proceeds to block 720 where a peripheral awareness indicator is displayed to visually indicate the general location of the pointer to the user. Thereafter, the routine 700 returns again to block 608 to monitor for additional pointer-related events.

The routine 700 does not specifically identify an end condition. Instead, it is contemplated that the routine 700 continues operating until the multi-monitor computer system is shut down. This corresponds to the belief that once the virtual space has been established and initialized, it is desirable to maintain its operation until the multi-monitor computer system is shut down. However, in an alternative embodiment (not shown), the virtual space may be shut down and the multi-monitor computer system could resume operating in a typical manner, where the pointer movements are tied to the internal display surface.

Figure 8A:
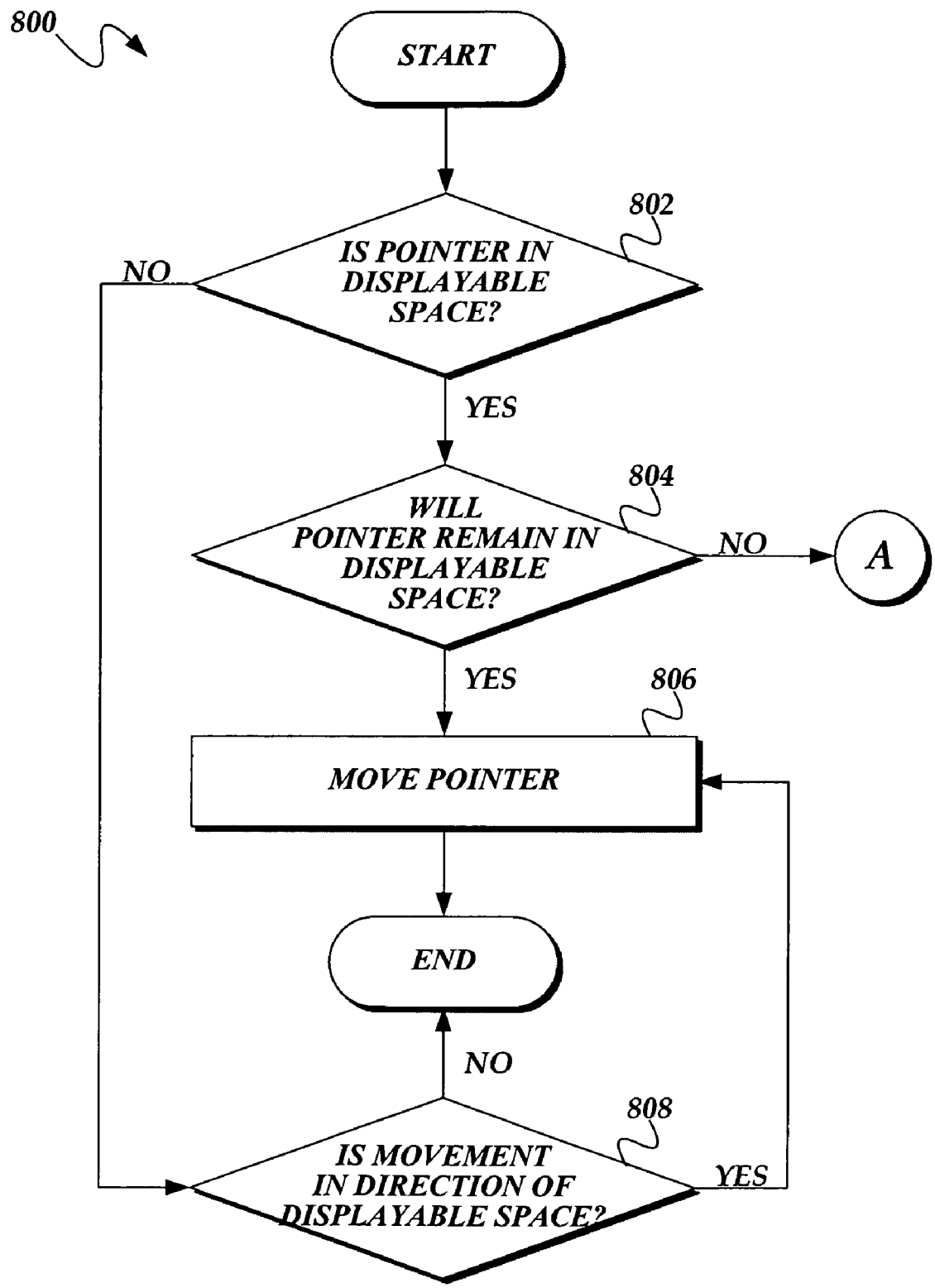
FIGS. 8A and 8B illustrate an exemplary routine for processing mouse movements for a pointer in virtual space.
Figure 8B:
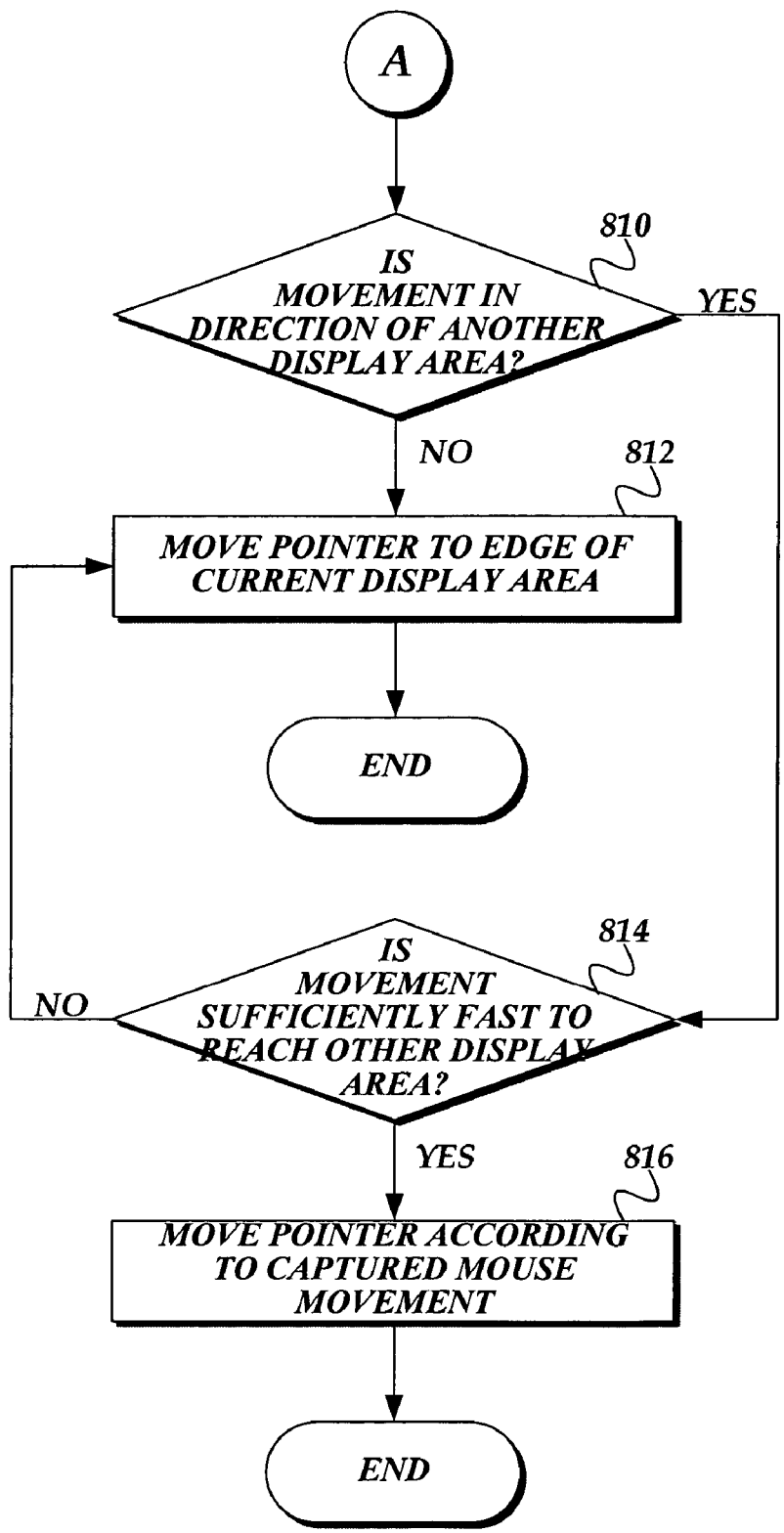

As indicated above, pointer movements are limited to the boundaries of the virtual space. However, a user can move the pointer into undisplayable or empty virtual space. When in empty virtual space, as user can easily "lose" the pointer, even though optional peripheral awareness indicators are displayed to help to alleviate this problem. Thus, in one embodiment, the virtual space assists the user in keeping track of the pointer by permitting the user to move the pointer into empty virtual space only under certain conditions. FIGS. 8A and 8B illustrate an exemplary routine 800 for updating the pointer position in virtual space according to mouse movements.

Beginning at decision block 802, a determination is made as to whether the pointer is currently located in displayable or non-empty virtual space, i.e., intersects with one of the virtual display areas in the virtual space. If the pointer is currently located in displayable virtual space, at decision block 804, another determination is made as to whether the pointer will remain in displayable virtual space if moved according to the captured mouse movements. If the pointer will remain in displayable virtual space if moved according to the captured mouse movements, at block 806, the pointer is moved according to the captured mouse movements, and the routine 800 terminates.

With reference again to decision block 802, if the pointer is not currently in displayable virtual space, the routine 800 proceeds to decision block 808. At decision block 808, another determination is made as to whether the captured mouse movement is in the direction of displayable virtual space. In other words, the system determines, while the pointer is in undisplayable virtual space, whether the user is moving the pointer towards a virtual display area. By ensuring that, while the pointer is located in empty virtual space, the user moves towards the pointer a virtual display area, the system prevents the user from losing the pointer. Accordingly, if the intercepted mouse movement is not in the direction of a virtual display area, the routine 800 disregards the captured mouse movement and terminates. Alternatively, if the captured mouse movement is in the direction of a virtual display area, the routine proceeds to block 806 mentioned above, where the pointer's position is updated according to the captured mouse movements. Thereafter, the routine 800 terminates.

With reference again to decision block 804, if the pointer is in a virtual display area but will not be located in a virtual display area after moving, i.e., will leave a virtual display area into empty virtual space, the routine 800 proceeds to block 810 (FIG. 8B). At decision block 810, a determination is made as to whether the captured mouse movement is in the direction of another virtual display area in the virtual space. If the captured mouse movement is not in the direction of another virtual display area, at block 812, the pointer is moved to the edge of the virtual display area in which the pointer is currently positioned along the direction of the captured mouse movement. Thereafter, the routine 800 terminates.

Ensuring that, while in empty virtual space, or when entering the empty virtual space, the pointer is always moved toward a virtual display area, will assist the user to not lose the pointer.

According to additional aspects of the present invention, when entering empty virtual space, if the empty virtual space between virtual display areas is large and/or if the captured mouse movement is small/slow, the likelihood that the user will lose the pointer in empty virtual space increases. Thus, according to further aspects of the present invention, when entering empty virtual space, even though the mouse movement is in the direction of a virtual display area, at decision block 814, another determination is made as to whether the captured mouse movement represents a threshold speed that is sufficiently fast such that, if the current speed is maintained, the pointer will not remain long in the empty virtual space. In other words, based on the difference between the current pointer position and the captured mouse position, as well as the empty virtual space between the current display area and the target virtual display area along the line of the mouse movement, a determination is made as to whether this combination meets or exceeds an allowable threshold. If so, at block 816, the pointer's position is updated according to the mouse movements, and the routine 800 terminates. However, if the combination is less than the allowable threshold, at block 812, the pointer is moved to the edge of the current virtual display area along the line of the mouse movement. Thereafter, the routine 800 terminates.

Even on computer systems with one monitor, and when the pointer is displayed on a display area, a user may lose track of the pointer. Thus, in spite of the precautions described above to ensure that the user does not lose the pointer, in any computer system, including a multi-monitor computer system having a virtual space, there may be times that the pointer is lost to the user. When this occurs, the user typically makes various locating gestures that are designed to cause the system to display a perceptible, on-screen motion which the user can detect. These pointer-locating gestures include moving the mouse quickly back and forth over a relatively small area, or moving the pointer in circles.

Thus, according to additional aspects of the present invention, in addition to the pointer-related events described above in regard to FIG. 7, additional pointer-related events may be monitored for, such that when they occur, the system assists the user to locate the pointer. These additional pointer-related events include monitoring whether the pointer has stopped, i.e., whether the user has stopped moving the mouse, and monitoring for pointer-locating gestures by the user.

Figure 9:
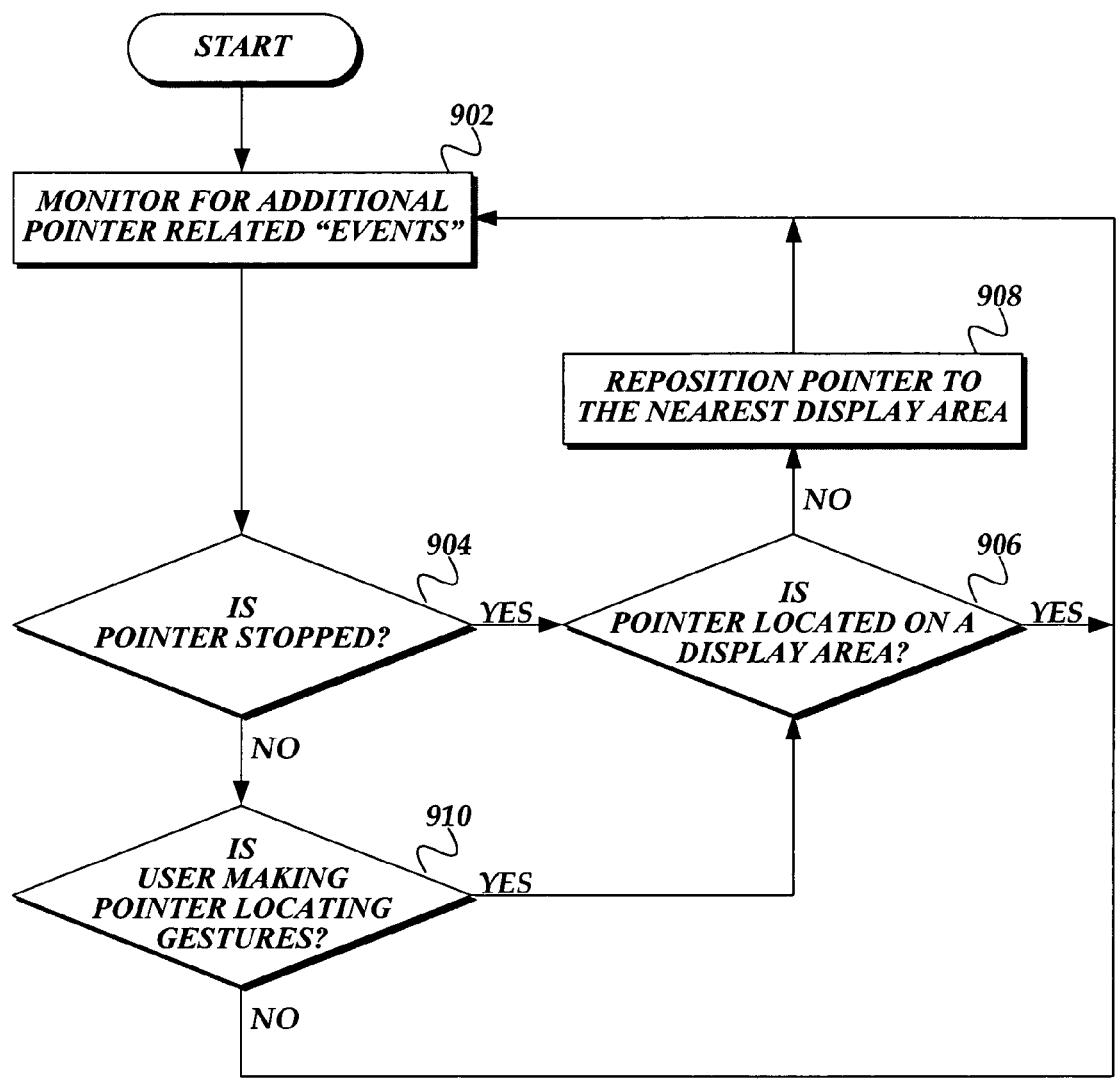
FIG. 9 is a flow diagram illustrating an exemplary routine for processing pointer events with regard to a pointer in virtual space.

FIG. 9 is a flow diagram illustrating an exemplary routine 900 for processing additional pointer-related events in a virtual space. Beginning at block 902, the exemplary routine 900 monitors for these additional pointer-related events. After detecting one of the additional pointer-related events, at block 904, a decision is made as to whether the detected pointer-related event indicates that the pointer is stopped. If the pointer is stopped, at decision block 906, determination is made as to whether the pointer is currently located in a virtual display area in the virtual space. As previously mentioned, in one embodiment, determining whether the pointer is currently located on a display area in the virtual space comprises iterating through the virtual display areas in the virtual space and determining whether the pointer image intersects with one or more virtual display areas.

If, at decision block 906, the pointer is stopped on a virtual display area, the routine 900 returns back to block 902 to monitor for further additional pointer-related events. Alternatively, if at block 906, the pointer is stopped in empty virtual space, the routine 900 proceeds to block 908. At block 908, the pointer is repositioned within the virtual space to the virtual display area closest to the pointer's current position. Thereafter, the routine 900 returns to block 902 to monitor for further additional pointer-related events.

At decision block 904, if the pointer is not stopped according to the detected pointer-related event, the routine proceeds to decision block 910. At decision block 910, a determination is made as to whether the user is making pointer-locating gestures, such as moving the mouse in a small circle or moving the mouse back and forth over a small area. If, at decision block 910, the user is making a pointer-locating gesture, the routine 900 proceeds to decision block 906, where a determination is made as to whether the pointer is currently located on a virtual display area. If the pointer is not located on a virtual display area, at block 908, the pointer is repositioned within the virtual space to a location on the nearest virtual display area. Thereafter, the routine 900 returns to block 902 to monitor for further additional pointer-related events. Alternatively, if, at decision block 910, the user is not making pointer-locating gestures, the routine 900 returns to block 902 to monitor for further additional pointer-related events. Similar to the exemplary routine 700, it is anticipated that routine 900 continually monitors for these addition pointer-related event, and terminates only when the virtual space is terminated.

While the various embodiments of the present invention have been illustrated and described, including the preferred embodiment, it will be appreciated that various changes can be made therein without departing from the spirit and scope of the invention.

The embodiments of the invention in which an exclusive property or privilege is claimed are defined as follows:

1. A multi-monitor computer system for displaying pointer movements in a visually correct manner as a pointer moves across monitor boundaries, the system comprising:
   a computing device connected to a plurality of monitors, the computing device having computer-executable instructions executed to establish:
      a display surface comprising display areas corresponding to each of the plurality of monitors connected to the computing device for displaying information on the plurality of monitors; and
      a virtual space comprising virtual display areas corresponding to each of the plurality of monitors connected to the computing device, wherein the virtual display areas are arranged within the virtual space such that their arrangement reflects the physical alignment and relative pixel resolutions of the plurality of monitors to a user, the virtual space including empty virtual space corresponding to the physical separation between the plurality of monitors;
   wherein the virtual space maintains the pointer position in virtual space coordinates, captures pointer movement events designed to update the position of the pointer as displayed on the plurality of monitors, and updates the pointer position within the virtual space according to the captured pointer movement events; and
   wherein the virtual display areas are arranged in the virtual space to reflect the visual appearance of the monitors to a user by sizing the virtual display areas in the virtual space to correspond to the physical size of the corresponding monitors according to their relative pixel resolution and relative screen resolution.

2. The multi-monitor computer system of claim 1, wherein, on each pointer update frame, the current pointer position is mapped from virtual space coordinates to the display areas of the display surface for display on the plurality of monitors.

3. The multi-monitor computer system of claim 2, wherein the virtual display areas are arranged in the virtual space to reflect the visual appearance of the monitors to a user according to calibration information obtained from a user calibration process.

4. The multi-monitor computer system of claim 3, wherein the calibration information obtained from the user calibration process includes the physical separation of the display areas as displayed on the plurality of monitors;

and wherein the virtual display areas are arranged to reflect the physical separation of the display areas as displayed on the plurality of monitors, such that the virtual space includes empty virtual space between the virtual display areas corresponding to the physical separation of the display areas as displayed on the plurality of monitors.

5. The multi-monitor computer system of claim 4, wherein the pointer is positioned within the empty virtual space such that, on a pointer update frame, at least a portion of the pointer's image is not drawn on the display surface.

6. The multi-monitor computer system of claim 5, wherein, on a pointer update frame, peripheral awareness indicators are drawn on the display surface when the current pointer position in the virtual space is in the empty virtual space.

7. The multi-monitor computer system of claim 6, wherein the calibration information obtained from the user calibration process includes the relative screen resolutions of the plurality of monitors;

and wherein the virtual space maintains its coordinates according to the highest relative screen resolution of the plurality of monitors.

8. The multi-monitor computer system of claim 7, wherein the calibration information obtained from the user calibration process includes the relative pixel resolutions of the plurality of monitors.

9. The multi-monitor computer system of claim 3, wherein the area of the virtual space is a convex hull that includes all of the virtual display areas.

10. A method for displaying pointer movements in a visually correct manner as a pointer crosses monitor boundaries on a multi-monitor computer system comprising a plurality of monitors connected to a computing device, the method comprising:

establishing a virtual space for the multi-monitor computer system, the virtual space comprising a plurality of virtual display areas corresponding to the plurality of monitors in the multi-monitor computer system, wherein the virtual display areas are arranged within the virtual space such that their arrangement reflects the physical alignment and relative pixel resolutions of the corresponding plurality of monitors to a user, the virtual space including empty virtual space corresponding to the physical separation between the plurality of monitors;

mapping the pointer for the multi-monitor computer system from its current position on the multi-monitor computer system's internal display surface to a visually corresponding location in the virtual space;

capturing pointer movement events designed to update the position of the pointer as displayed on the plurality of monitors;

updating the pointer position in regard to the virtual space according to the captured pointer movement events;

for each pointer update frame, mapping the pointer from its position in the virtual space to a corresponding location on the multi-monitor computer system's internal display surface for display to the user; and wherein the virtual display areas are arranged in the virtual space to reflect the visual appearance of the monitors to a user by sizing the virtual display areas in the virtual space to correspond to the physical size of the corresponding monitors according to their relative pixel resolution and relative screen resolution.

11. The method of claim 10, wherein the virtual display areas are arranged in the virtual space such that their arrangement reflects the visual appearance of the monitors to a user according to calibration information obtained from a user calibration process.

12. The method of claim 11, wherein the calibration information obtained from the user calibration process includes the physical separation of the display areas as displayed on the plurality of monitors;

and wherein the virtual display areas are arranged in the virtual space such that their arrangement reflects the visual appearance of the monitors as displayed on the plurality of monitors such that the virtual space includes empty virtual space between the virtual display areas corresponding to the physical separation of the display areas as displayed on the plurality of monitors.

13. The method of claim 12, wherein the pointer is positioned within the empty virtual space when updating the pointer position in regard to the virtual space according to captured pointer movement events.

14. The method of claim 13, wherein mapping the pointer from its position in the virtual space to a corresponding location on the multi-monitor computer system's internal display surface for display to the user comprises determining whether at least a portion of the pointer's image displayed to the user intersects with a virtual display area, and if so, mapping said portion of the pointer's image from the virtual display area in virtual space to the corresponding display area on the internal display surface and drawing that portion of the pointer's image onto the corresponding display area.

15. The method of claim 13, wherein mapping said pointer from its position in the virtual space to a corresponding location on the multi-monitor computer system's internal display surface for display to the user comprises determining whether at least a portion of a pointer's image displayed to the user is located in empty virtual space, and if so, displaying peripheral awareness indicators on display areas adjacent to the corresponding current pointer location in virtual space.

16. The method of claim 12, wherein the calibration information obtained from the user calibration process includes the relative screen resolutions of the plurality of monitors, and wherein the virtual space maintains its coordinates according to the highest relative screen resolution of the plurality of monitors.

17. The method of claim 16, wherein the calibration information obtained from the user calibration process includes the relative pixel resolutions of the plurality of monitors.

18. A tangible computer-readable storage medium having computer-executable instructions which, when executed on a multi-monitor computer system including a computing device and a plurality of monitors, carry out a method for displaying pointer movements in a visually correct manner as a pointer crosses monitor boundaries on a multi-monitor computer system comprising a plurality of monitors connected to a computing device, the method comprising:

establishing a virtual space for the multi-monitor computer system, the virtual space comprising a plurality of virtual display areas corresponding to the plurality of monitors in the multi-monitor computer system, wherein the virtual display areas are arranged within the virtual space such that their arrangement reflects the physical alignment and relative pixel resolutions of the corresponding plurality of monitors to a user, the virtual space including empty virtual space corresponding to the physical separation between the plurality of monitors;

mapping the pointer for the multi-monitor computer system from its current position on the multi-monitor computer system's internal display surface to a visually corresponding location in the virtual space;

capturing pointer movement events designed to update the position of the pointer as displayed on the plurality of monitors;

updating the pointer position in regard to the virtual space according to the captured pointer movement events;

for each pointer update frame, mapping the pointer from its position in the virtual space to a corresponding location on the multi-monitor computer system's internal display surface for display to the; and wherein the virtual display areas are arranged in the virtual space to reflect the visual appearance of the monitors to a user by sizing the virtual display areas in the virtual space to correspond to the physical size of the corresponding monitors according to their relative pixel resolution and relative screen resolution.

19. The computer-readable storage medium of claim 18, wherein the virtual display areas are arranged in the virtual space such that their arrangement reflects the visual appearance of the monitors to a user according to calibration information obtained from a user calibration process.

20. The computer-readable storage medium of claim 19, wherein the calibration information obtained from the user calibration process includes the physical separation of the display areas as displayed on the plurality of monitors.

* * * * *